J. B. ASHENFELTER.
EQUALIZER HOOK FOR VEHICLE DRAFT APPARATUS.
APPLICATION FILED DEC. 23, 1907.
902,042.
Patented Oct. 27, 1908.
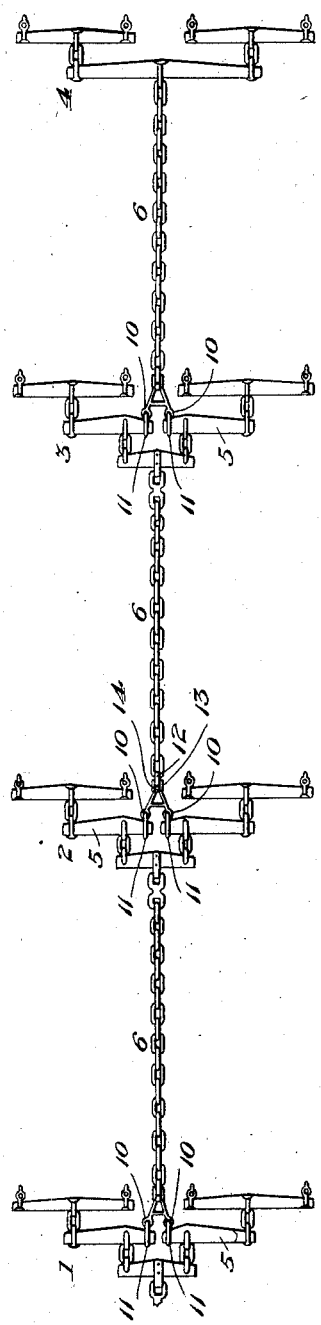
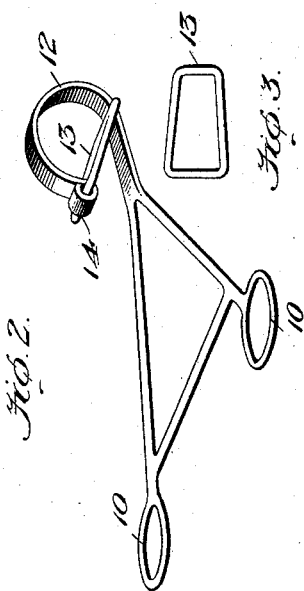
Witnesses
Inventor
Jacob B. Ashenfelter
By Henry N. Copp
his Attorney

UNITED STATES PATENT OFFICE.

JACOB B. ASHENFELTER, OF OLEX, OREGON.

EQUALIZER-HOOK FOR VEHICLE DRAFT APPARATUS.

No. 902,042.   Specification of Letters Patent.   Patented Oct. 27, 1908.

Application filed December 23, 1907. Serial No. 407,698.

*To all whom it may concern:*

Be it known that I, JACOB B. ASHENFELTER, a citizen of the United States, residing at Olex, county of Gilliam, and State of Oregon, have invented certain new and useful Improvements in Equalizer-Hooks for Vehicle Draft Apparatus, of which the following is a specification.

My invention relates to equalizer hooks for vehicle draft apparatus.

Heretofore the loop or triangle generally used to connect the draft chain with the respective sets of doubletrees has been unsatisfactory and not reliable on account of its open formation, permitting it to shift or slip to different positions while in use, thereby transferring too much draft to the end of the doubletree to which the loop has slipped; and another inconvenience has been that the draft apparatus or "hitch" could not be conveniently taken apart.

The object of my invention is to obviate the foregoing difficulties by the provision of an equalizing hook of such novel construction that it cannot slip and will always maintain the line of draft the same, beside having a bill provided with a guard, whereby the draft chain can be readily detached and the whole hitch taken apart.

The invention is set forth fully hereinafter and the novel features are recited in the appended claims.

In the accompanying drawings:—Figure 1 is a plan view showing the invention in use; Fig. 2 is a detail perspective of the invention; and Fig. 3, a detail of the guard.

The different sets of doubletrees of a draft apparatus or hitch are shown at 1, 2, 3 and 4, the number being immaterial.

The present invention is intended for use in connection with the doubletrees 5 to connect their inner adjacent ends to the sections 6 of the draft chain. Heretofore open triangular loops have been generally used for this purpose, but these possess the disadvantage of slipping and thus throwing unequal draft on the different doubletrees 5.

The present invention may be made from a single piece of metal or from rods suitably welded or twisted to provide two eyes 10 through which the doubletree hooks 11 are engaged. These eyes, being comparatively small, permit no slipping or derangement of the equalizer hook and hence the line of draft cannot be disturbed.

The device is provided with a hook 12 to be passed through the end link of the draft chain 6, and this hook or bill is guarded by a gravity guard or latch 13, pivoted at 14. On raising the latch, the draft chain can be readily removed.

Having thus described my invention, what I claim as new and desire to secure by Letters Patent is:—

1. An equalizing hook for vehicle draft apparatus, comprising an open hook or bill permitting attachment and detachment of the draft chain, and independent closed eyes for connection to the doubletree hooks.

2. An equalizing hook for vehicle draft apparatus, comprising an open hook or bill permitting attachment and detachment of the draft chain, a releasable guard or closure for said bill or hook to prevent accidental detachment of the draft chain therefrom, and independent closed eyes for connection to the doubletree hooks.

In testimony whereof, I hereunto affix my signature in presence of two witnesses.

JACOB B. ASHENFELTER.

Witnesses:
 CLAUDE RANDALL,
 LAWRENCE CHILDS.